(12) United States Patent
Liu

(10) Patent No.: US 10,726,249 B2
(45) Date of Patent: Jul. 28, 2020

(54) METHOD AND ELECTRONIC APPARATUS FOR WAVE DETECTION

(71) Applicant: QNAP SYSTEMS, INC., New Taipei (TW)

(72) Inventor: Chan-Cheng Liu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 135 days.

(21) Appl. No.: 16/105,957

(22) Filed: Aug. 20, 2018

(65) Prior Publication Data

US 2019/0057251 A1 Feb. 21, 2019

(30) Foreign Application Priority Data

Aug. 18, 2017 (TW) .............................. 106128062 A

(51) Int. Cl.
| | |
|---|---|
| *G06K 9/00* | (2006.01) |
| *G06K 9/62* | (2006.01) |
| *G06T 7/254* | (2017.01) |
| *G06F 3/01* | (2006.01) |

(52) U.S. Cl.
CPC ..... *G06K 9/00355* (2013.01); *G06K 9/00664* (2013.01); *G06K 9/6212* (2013.01); *G06K 9/6215* (2013.01); *G06T 7/254* (2017.01); *G06F 3/017* (2013.01); *G06T 2207/30196* (2013.01)

(58) Field of Classification Search
CPC combination set(s) only.
See application file for complete search history.

(56) References Cited

U.S. PATENT DOCUMENTS

| | | |
|---|---|---|
| 2007/0252814 A1 | 11/2007 | Lin et al. |
| 2009/0060270 A1 | 3/2009 | Lee et al. |
| 2012/0106792 A1* | 5/2012 | Kang ................. G06F 3/017 |
| | | 382/103 |
| 2014/0125582 A1* | 5/2014 | Wang .................. G06F 3/017 |
| | | 345/156 |

\* cited by examiner

*Primary Examiner* — Alex Kok S Liew
(74) *Attorney, Agent, or Firm* — JCIPRNET

(57) ABSTRACT

A method and an electronic apparatus for wave detection are provided. The method is adapted to the electronic apparatus having an image capturing device and a processor, and includes following steps: successively capturing a plurality of images; calculating a difference image between each two adjacent images among the images, and determining whether a variation degree of the difference images is over a predetermined degree according to pixel values of a plurality of pixels in the difference images; if the variation degree is over the predetermined degree, detecting a variation range formed by the pixels having the pixels values to which a predetermined variation is occurred in each of the difference images and determining whether a variation frequency of the pixel values within the detected variation range is over a predetermined frequency; and if the variation frequency is over the predetermined frequency, determining that a wave movement appears in the images.

12 Claims, 4 Drawing Sheets

METHOD AND ELECTRONIC APPARATUS FOR WAVE DETECTION

CROSS-REFERENCE TO RELATED APPLICATION

This application claims the priority benefit of Taiwan application serial no. 106128062, filed on Aug. 18, 2017. The entirety of the above-mentioned patent application is hereby incorporated by reference herein and made a part of this specification.

BACKGROUND OF THE INVENTION

1. Field of the Invention

The invention relates to a method and an electronic apparatus for image processing, and more particularly, to a method and an electronic apparatus for wave detection.

2. Description of Related Art

When watching television, the user usually uses a remote control to change channel or adjust volume. For new smart televisions, a camera is disposed on the TV so the camera can capture images of the user and then conduct image processing for the images. Then, action of the user may be identified and the corresponding function may be executed accordingly. For example, when detecting that the user is waving arms, television can execute functions, such as changing channel, displaying operation menu and the like according to a waving orientation. In this way, the user can operate television in a simple and intuitive manner.

The conventional method for wave detection includes a background difference analysis, a motion trajectory detection, etc. In the background difference analysis, a front camera is used to capture a plurality of images in front of television, and a background image is calculated by using a background modeling method. Subsequently, each captured image is divided into a plurality of regions to be compared with the corresponding regions in the background image, and a timestamp is recorded for the regions having greater difference. Lastly, a recorded timestamp sequence is analyzed to determine whether a feature matching a waving movement appears. However, because the background modeling requires a lot of computation, this method will consume more power and occupies more computation resources. Also, in order to identify a specific feature, it is required to collect a large amount of samples for training and storing an identifier model. This will occupy a storage space of the device.

In the motion trajectory detection, an object segmentation algorithm is performed on each image according to features such as a surface texture, and a moving object is then analyzed to determine whether a motion trajectory thereof meets a waving feature. Nonetheless, the object segmentation algorithm also requires a large amount of computation. Moreover, when the object moves, a motion blur will occur to lower a reliability of the detected texture.

SUMMARY OF THE INVENTION

The invention is directed to a method and an electronic apparatus for wave detection, and adopts the most basic information for analyzing a variation range of pixels between the captured images and a variation frequency of pixel values therein, such that a wave detection may be realized without occupying too much computation resources.

A method for wave detection is adapted to an electronic apparatus having an image capturing device and a processor. The method includes steps of: successively capturing a plurality of images by the image capturing device; calculating a difference image between each two adjacent images among the captured images, and determining whether a variation degree of the difference images is over a predetermined degree according to pixel values of a plurality of pixels in the difference images by the processor; if the variation degree is over the predetermined degree, detecting a variation range formed by the pixels having the pixels values to which a predetermined variation is occurred in each of the difference images and determining whether a variation frequency of the pixel values within the detected variation range is over a predetermined frequency by the processor; and if the variation frequency is over the predetermined frequency, determining that a wave movement appears in the images by the processor.

In an embodiment of the invention, the step of determining whether the variation degree of the difference images is over the predetermined degree according to the pixel values of the pixels in the difference images includes: checking whether the pixel value is greater than a first threshold for each of the pixels in the difference images. If the pixel value of the pixel is greater than the first threshold, that pixel is marked in an accumulated dynamic image. Then, the step above is repeated, and whether the variation degree of the difference images is over the predetermined degree is determined according to a number of times marked in the accumulated dynamic image for each of the pixels after successively checking N said difference images, wherein N is a positive integer greater than 1.

Based on the above, in the method and the electronic apparatus for wave detection of the invention, according to characteristic of the user's wave movement, by calculating the difference image between the adjacent images and comparing the pixel value of each pixel in the difference image with the preset thresholds, enough dynamic pixels can then be located. Subsequently, the variation range formed by the pixels are used to calculate the variation frequency of the pixel values. Lastly, once the calculated variation frequency is over the predetermined frequency, it is then determined that the wave movement appears in the images. Because the method of the invention only adopts addition/subtraction and condition determination, the amount of computation may be effectively reduced without occupying too much system resources.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
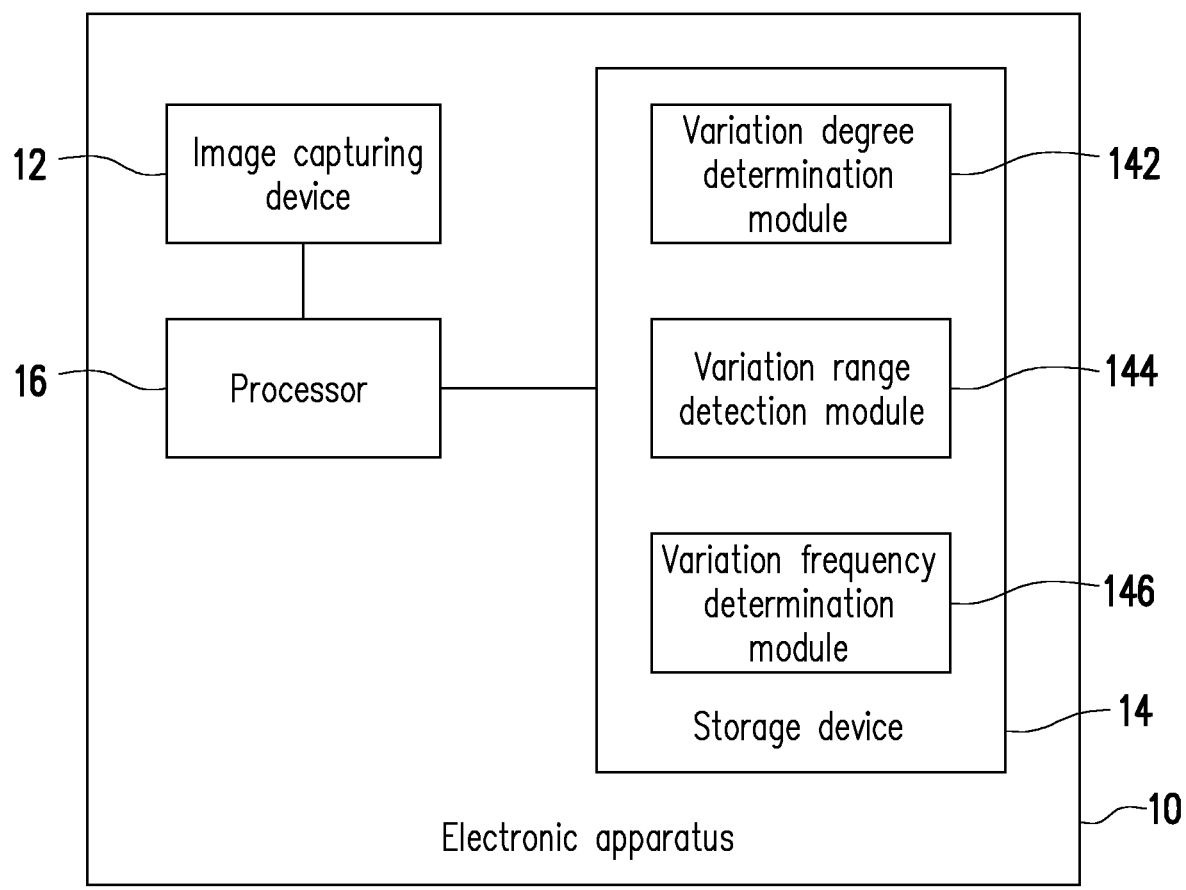
FIG. 1 is a block diagram illustrating an electronic apparatus for wave detection according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The action of the user when waving hand (or waving object) is characterized in that the arm (or the object) will repeatedly swings within a specific range in the images. As such, if a difference between adjacent images at each time point can be obtained, a variation will constantly appears within the specific range. Accordingly, the invention aims to obtain a difference image between the adjacent images captured within a period of time, and calculate a range in which a predetermined variation occurred on pixel values. If a variation frequency of pixels within the range is high, it is then determined that the wave movement does appear. In this way, a wave detection can be realized by executing a simple computation only using the most basic information of the images.

FIG. 1 is a block diagram illustrating an electronic apparatus for wave detection according to an embodiment of the invention. With reference to FIG. 1, an electronic apparatus 10 of the present embodiment is, for example, a computer device with computing capability such as a server, a workstation or a personal computer, or a home appliance controllable by wave movements of the user, such as a television, a video recorder, a sound system or other electronic products. The type of the electronic apparatus 10 is not particularly limited in the preset embodiment. The electronic apparatus 10 includes an image capturing device 12, a storage device 14 and a processor 16, and their functions are described as follows.

The image capturing device 12 is, for example, a camera including an optical lens and a photosensitive device such as a charge coupled device (CCD) or a complementary metal-oxide semiconductor (CMOS) device, and is, for example, disposed in front of the electronic apparatus 10 and configured to capture images in front of the electronic apparatus 10. For instance, the image capturing device 12 may be disposed on top of a television display panel for example, so as to capture images of the user who is watching television.

The storage device 14 may be a fixed or a movable device in any form including a random access memory, a read-only memory, a flash memory, or other similar devices, or a combination of the above-mentioned devices. In the present embodiment, the storage device 14 is configured to record a variation degree determination module 142, a variation range detection module 144 and a variation frequency determination module 146. These modules are, for example, computer programs stored in the storage device 14.

The processor 16 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 16 is coupled to the image capturing device 12 and the storage device 14, and is capable of loading and executing the computer programs of the variation degree determination module 142, the variation range detection module 144 and the variation frequency determination module 146 from the storage device 14 so as to realize the method for wave detection in the embodiments of the present application. Various embodiments are provided below and served to describe detailed step of said method.

Figure 2:
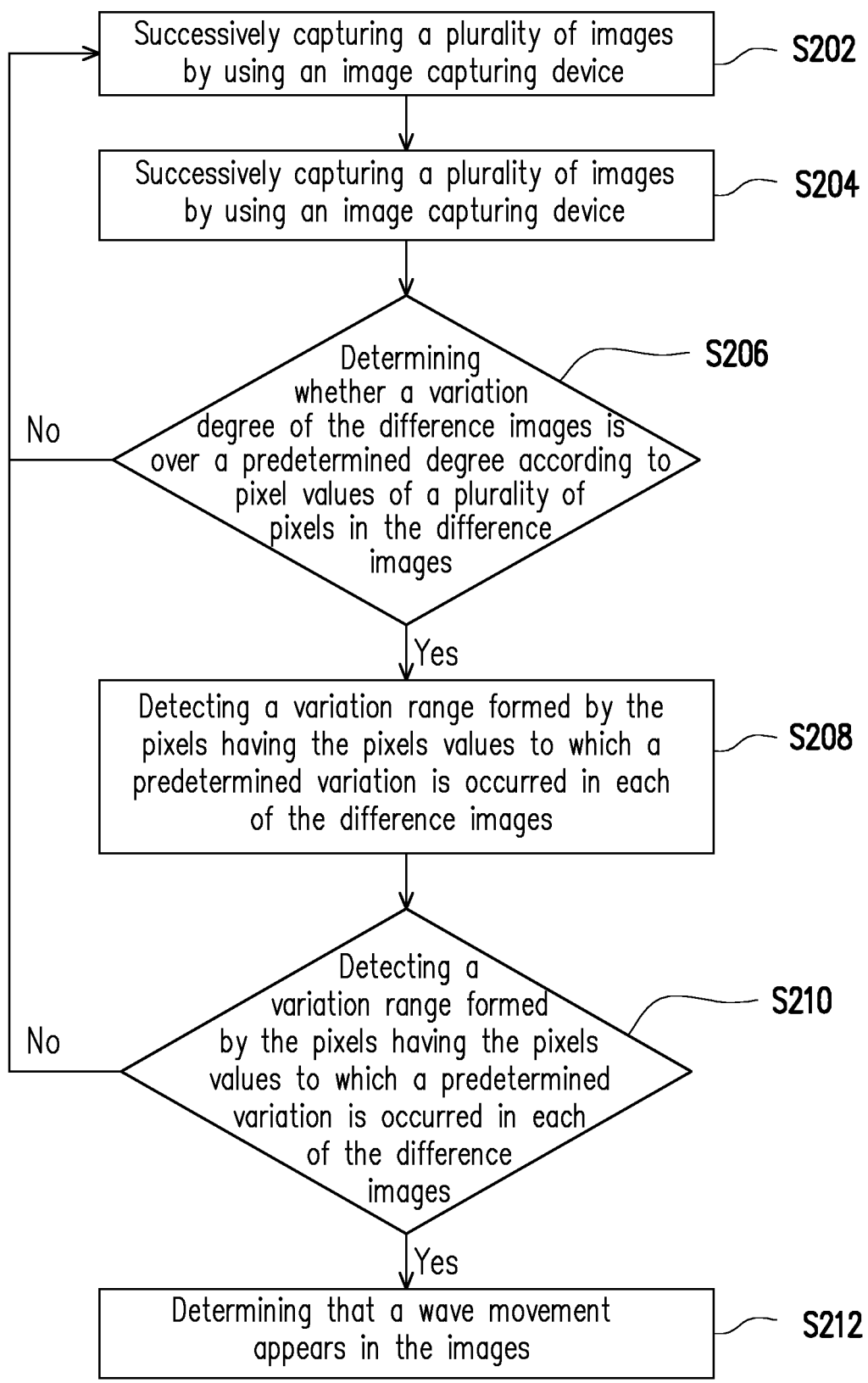
FIG. 2 is a flowchart of a method for wave detection according to an embodiment of the invention.

FIG. 2 is a flowchart of a method for wave detection according to an embodiment of the invention. Referring to FIG. 1 and FIG. 2 together, the method of the present embodiment is adapted to the electronic apparatus 10 described above. Detailed steps in the method for wave detection in the present embodiment are described below with reference to each device in the electronic apparatus 10.

First, the processor 16 uses the image capturing device 12 to successively capture a plurality of images (step S202). Here, the processor 16 uses the image capturing device 12 to capture the images within a period of time and determine a wave movement by using the images, for example.

In details, the processor 16 executes the variation degree determination module 142, for example, so as to calculate a difference image between each two adjacent images among the images captured by the image capturing device 12, and determine whether a variation degree of the difference images is over a predetermined degree according to pixel values of a plurality of pixels in the difference images (step S204). Here, the variation degree determination module 142 determines whether the pixel has a significant change according to, for example, whether the pixel value of each pixel in the difference image is over a predetermined threshold, and accumulates a number of times that the pixel is determined as having the significant change for each pixel in most recent N said images. The number of times is then compared with the predetermined threshold, such that whether the variation degree of the difference images is over the predetermined degree may be determined.

Figure 3:
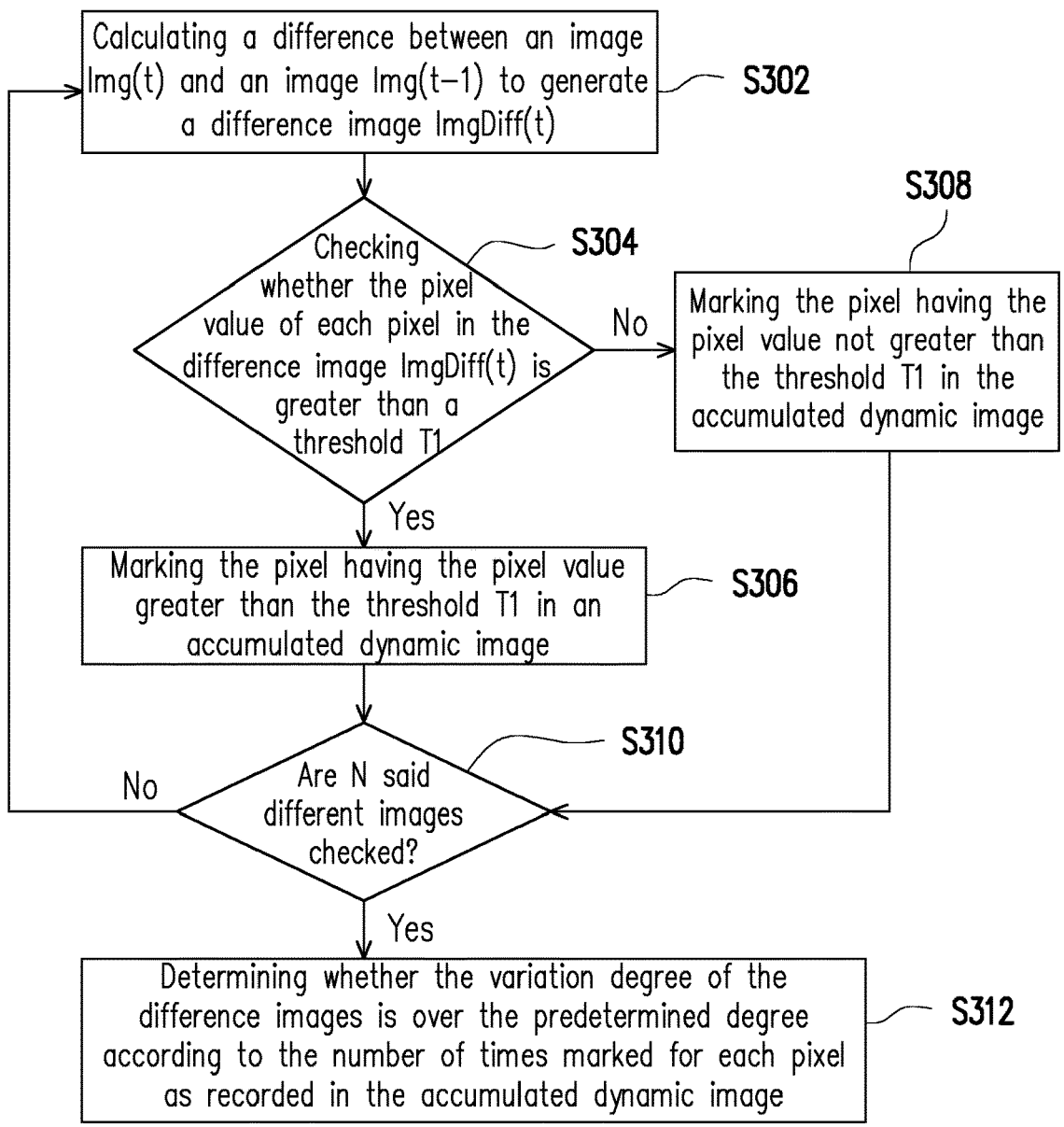
FIG. 3 is a flowchart of a method for detecting a variation degree of difference images according to an embodiment of the invention.

Specifically, FIG. 3 is a flowchart of a method for detecting a variation degree of difference images according to an embodiment of the invention. With reference to FIG. 3, FIG. 3 is detailed process of step S204 in FIG. 2.

First, the variation degree determination module 142 calculates a difference between a current image Img(t) and a previous image Img(t−1) captured by the image capturing device 12, so as to generate a difference image ImgDiff(t) (step S302).

Next, the variation degree determination module 142 checks whether the pixel value of each pixel in the difference image ImgDiff(t) is greater than a threshold T1 (step S304). If yes, the variation degree determination module 142 marks the pixel having the pixel value greater than the threshold T1 in an accumulated dynamic image ImgSumDyn (step S304); otherwise, the variation degree determination module 142 marks the pixel having the pixel value not greater than the threshold T1 in the accumulated dynamic image ImgSumDyn (step S306). The threshold T1 is, for example, any value between 1 and 30 (setting of the threshold T1 relates to, for example, a type of the analyzed color space; RGB color space is used hereinafter as an example). The accumulated dynamic image ImgSumDyn is, for example, an image with the same size as the images Img(t) and Img(t−1), and may be used to record a sum dynamic count of each pixel in the images Img(t) and Img(t−1). In an embodiment, the variation degree determination module 142, for example, marks the pixel having the pixel value greater than the threshold T1 as 1 and marks the pixel having the pixel value not greater than the threshold T1 as −1 in the accumulated dynamic image ImgSumDyn, but the invention is not limited thereto.

After marking the pixels from the difference image ImgDiff(t) in the accumulated dynamic image ImgSumDyn according to the sizes of the pixel values, the variation degree determination module 142 determines whether N said different images ImgDiff(t) are already checked (step S308), where N is a positive integer greater 1. If no, the variation degree determination module 142 sets the current image Img(t) as the previous image Img(t−1) and uses a next image as the current image Img(t). Then, in step S302, the variation degree determination module 142 re-calculates the difference image ImgDiff(t) between the image Img(t) and the image Img(t−1), and marks the pixels from the difference image ImgDiff(t) in the accumulated dynamic image ImgSumDyn again according to the sizes of the pixel values. Here, the number of times marked in the accumulated dynamic image ImgSumDyn is accumulated for each pixel, and it is also ensured that the sum dynamic count of each pixel is not less than 0.

On the other hand, if N said the difference images ImgDiff(t) are already checked, the variation degree determination module 142 can determine whether the variation degree of the difference images is over the predetermined degree according to the number of times marked for each pixel as recorded in the accumulated dynamic image ImgSumDyn (step S310). Specifically, in an embodiment, the variation degree determination module 142, for example, determines whether at least one of the pixels having the number of times marked over a threshold T2 exists in the accumulated dynamic image ImgSumDyn. If the at least one of the pixels having the number of times marked over the threshold T2 exists, the variation degree determination module 142 can determine that the variation degree of the difference images is over the predetermined degree. The threshold T2 is, for example, any value between 10 and 30.

Referring back to the process in FIG. 2, when the variation degree determination module 142 determines that the variation degree of the difference images is over the predetermined degree, the processor 16 executes the variation range detection module 144, so as to detect a variation range formed by the pixels having the pixels values to which a predetermined variation is occurred in each of the difference images (step S208). Here, the variation range detection module 144, for example, searches a plurality of dynamic pixels having the number of times marked over a threshold T3 in the accumulated dynamic image ImgSumDyn, and locates a smallest rectangle having a range capable of including the dynamic pixels to serve as the variation range. The threshold T3 is, for example, any value between 5 and 30.

Specifically, the variation range detection module 144 marks, for example, the pixels having the number of times marked over threshold T3 in the accumulated dynamic image ImgSumDyn as 1 in an image ImgWave and otherwise as 0. Then, the variation range detection module 144 uses the rectangle (serving as the variation range) to include a contour formed by the pixels marked as 1 in the image ImgWave.

Figure 4:
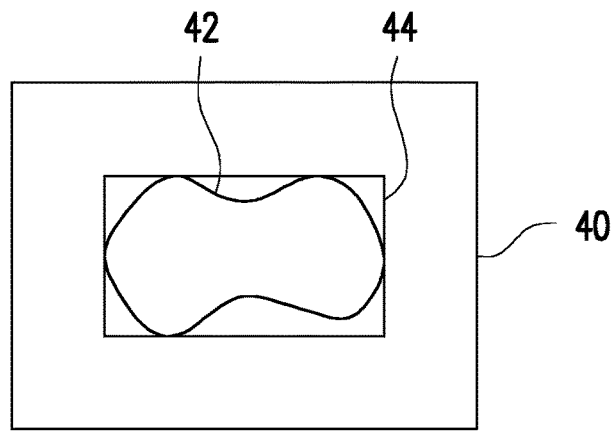
FIG. 4 is an example of a variation range in an image according to an embodiment of the invention.

For instance, FIG. 4 is an example of a variation range in an image according to an embodiment of the invention. With reference to FIG. 4, an image 40 is, for example, an image configured to record the pixels having the number of times marked over the threshold T3 in the accumulated dynamic image ImgSumDyn, and the image 40 has the same size as the accumulated dynamic image ImgSumDyn. Here, the pixels having the number of times marked over the threshold T3 in the accumulated dynamic image ImgSumDyn is marked as 1 in the image 40, and otherwise as 0. The pixels marked as 1 will form a region surrounded by a contour 42 in the image 40. A smallest rectangle 44 capable of including the contour 42 may be located by using the upper, lower, left and right vertices of the contour 42. The smallest rectangle 44 may then used as the variation range of the dynamic pixels.

Referring back to the process of FIG. 2, after detecting the variation range, the processor 16 executes the variation frequency determination module 146, so as to determine whether a variation frequency of the pixel values within the detected variation ranges is over a predetermined frequency (step S208). Here, if the variation frequency is over the predetermined frequency, the variation frequency determination module 146 then determines that a wave movement appears in the images (step S212). Otherwise, if the variation frequency is not over the predetermined frequency, the process returns to step S202, in which the image capturing device 12 continues to capture the next image. Then, actions in step S204 to S210 are repeated, and it is determined that the wave movement appears in the images only when the variation frequency of the pixel values within the variation range is over the predetermined frequency.

According to the method described above, the characteristic of wave movement (i.e. repeatedly swinging within a specific range) is taken as the criteria for distinguishing the wave movement from non-wave movement, in which the trajectory of moving objects in the image is analyzed to derive the variation range (i.e. a range where a variation constantly occurs for a period of time) and then the variation frequency of the pixel values within the variation range is analyzed to verify the wave movement. As a result, even if there are other moving objects (e.g. walking people or moving vehicle) appeared in the image in addition to the waving object, the wave movement can still be precisely identified while other moving objects are excluded.

It should be noted that, the variation frequency determination module 146, for example, checks whether the variation range detected from each of the difference images calculated from most recent M said images meets a stability condition, and counts a number of times that the stability condition is met as checked from the variation ranges. Lastly, the variation frequency determination module 146 divides the number of times by M to generate the variation frequency, where M is a positive integer greater than 1. In an embodiment, the variation frequency determination module 146, for example, determines whether the variation range detected from the current difference image meets the stability condition by comparing the variation range detected from a current difference image with the variation range detected from k said difference images before the current difference image.

Figure 5:
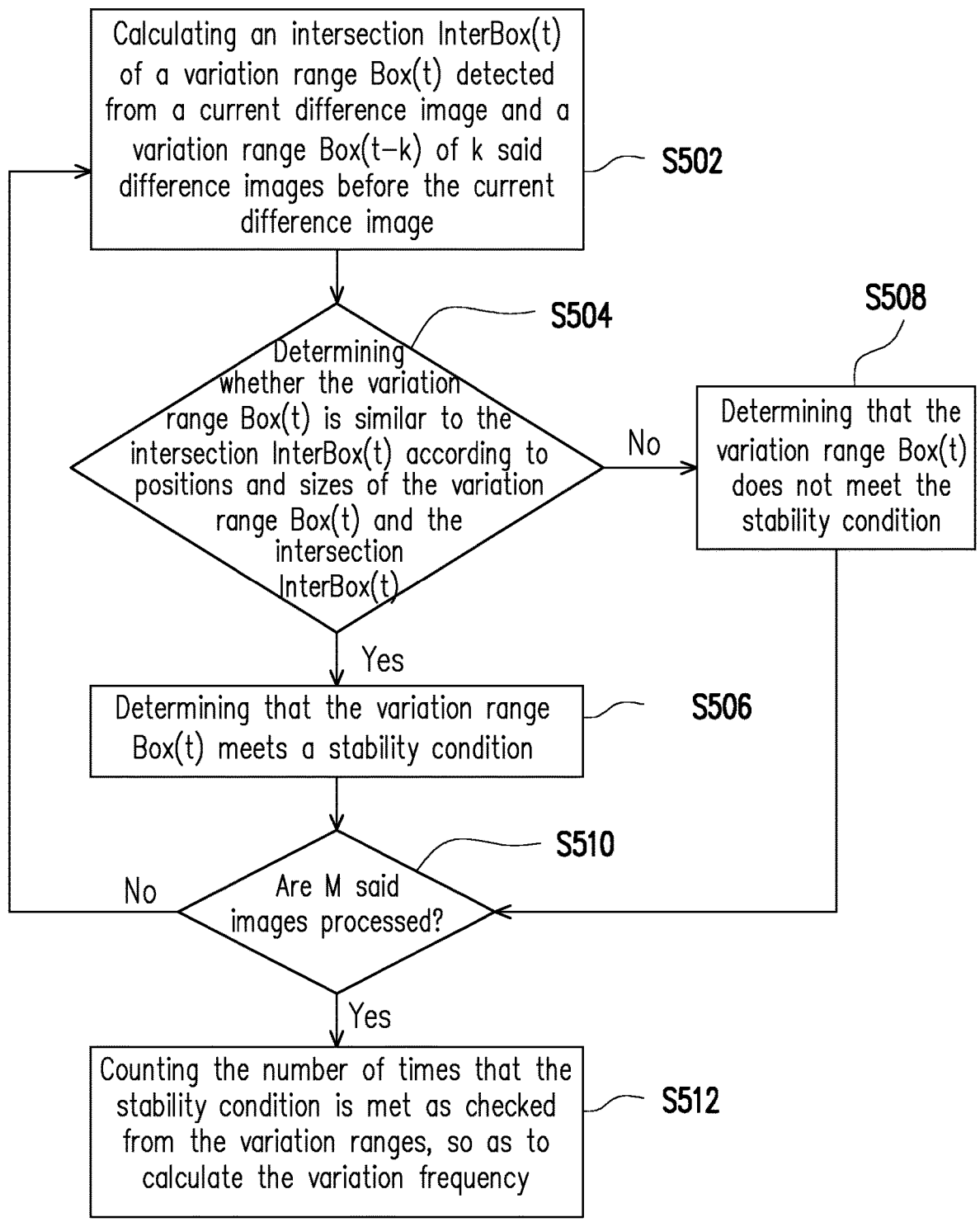
FIG. 5 is a flowchart for calculating a variation frequency of the pixel values in the variation range according to an embodiment of the invention.

Specifically, FIG. 5 is a flowchart for calculating a variation frequency of the pixel values in the variation range according to an embodiment of the invention. With reference to FIG. 5, the present embodiment describes the process of calculating the variation frequency in step S210 of FIG. 2 in more details.

First, the processor 16 executes the variation frequency determination module 146, so as to calculate an intersection InterBox(t) of a variation range Box(t) detected from the current difference image and a variation range Box(t−k) of k said difference images before the current difference image (step S502), where k is a positive integer. For instance, if k is 2, the intersection InterBox(t) is a result obtained by calculating an intersection of the variation ranges Box(t), Box(t−1) and Box(t−2).

Next, the variation frequency determination module 146 determines whether the variation range Box(t) is similar to the intersection InterBox(t) according to positions and sizes of the variation range Box(t) and the intersection InterBox(t) (step S504). In an embodiment, whether the variation range Box(t) is similar to the intersection InterBox(t) may be determined according to a size of an overlapping proportion of the variation range Box(t) and the intersection InterBox(t).

If it is determined that the variation range Box(t) is similar to the intersection InterBox(t), the variation frequency determination module 146 can then determine that the variation range Box(t) meets the stability condition (step S506), and otherwise determine that the variation range Box(t) does not meet the stability condition (step S508).

After determining whether the variation range Box(t) detected from the current difference image meets the stability condition, the variation frequency determination module 146 checks whether M said images are already processed at present (step S510), where M is a positive integer greater than 1. In details, the variation range detection module 144, for example, checks whether the variation range meeting the stability condition frequently appears in most recent M said images, and then calculated a variation frequency according to a number of times that the variation range appears.

If the number of processed image is less than M, the process returns to step 5502, in which the next difference image is processed; if M said images are already processed, the variation range detection module 144 counts the number of times that the stability condition is met as checked from the variation ranges, and divides the number of times by M to generate the variation frequency (step S512). The variation frequency may be provided to the variation frequency determination module 146 as a reference for determining whether the wave movement appears in the images.

In summary, according to the method and the electronic apparatus for wave detection of the invention, the computation amount can be effectively reduced since only the most basic information of the image (i.e., the pixel value) is adopted and the pixel values of the images are processed by using only difference computation, pixel mark up and condition determination. As a result, the wave detection may be realized without occupying too much computation resources according to the embodiments of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for wave detection, adapted to an electronic apparatus having an image capturing device and a processor, the method comprising:
    successively capturing a plurality of images by using the image capturing device;
    calculating a difference image between each two adjacent images among the images and determining whether a variation degree of the difference images is over a predetermined degree according to pixel values of a plurality of pixels in the difference images by the processor;
    if the variation degree is over the predetermined degree, detecting a variation range formed by the pixels having the pixels values to which a predetermined variation is occurred in each of the difference images and determining whether a variation frequency of the pixel values within the detected variation range is over a predetermined frequency by the processor; and
    if the variation frequency is over the predetermined frequency, determining that a wave movement appears in the images by the processor.

2. The method for wave detection according to claim 1, wherein the step of determining whether the variation degree of the difference images is over the predetermined degree according to the pixel values of the pixels in the difference images comprises:
    checking whether the pixel value is greater than a first threshold for each of the pixels in the difference images;
    if the pixel value of the pixel is greater than the first threshold, marking the pixel in an accumulated dynamic image;
    repeating the step above, and determining whether the variation degree of the difference images is over the predetermined degree according to a number of times marked in the accumulated dynamic image for each of the pixels after successively checking N said difference images, wherein N is a positive integer greater than 1.

3. The method for wave detection according to claim 2, wherein the step of determining whether the variation degree of the difference images is over the predetermined degree according to the number of times marked in the accumulated dynamic image for each of the pixels comprises:
    determining whether at least one of the pixels having the number of times marked over a second threshold exists in the accumulated dynamic image;
    if the at least one of the pixels having the number of times marked over the second threshold exists, determining that the variation degree of the difference images is over the predetermined degree.

4. The method for wave detection according to claim 2, wherein the step of detecting the variation range formed by the pixels having the pixels values to which the predetermined variation is occurred in each of the difference images by the processor comprises:
    searching a plurality of dynamic pixels having the number of times marked over a third threshold among the pixels of the accumulated dynamic image; and
    locating a smallest rectangle having a range capable of including the dynamic pixels to serve as the variation range.

5. The method for wave detection according to claim 1, wherein before the step of determining whether the variation frequency of the detected variation range is over the predetermined frequency, the method further comprises:
    checking whether the variation range detected from each of the difference images calculated from most recent M said images meets a stability condition, wherein M is a positive integer greater than 1; and
    counting a number of times that the stability condition is met as checked from the variation ranges, and dividing the number of times by M to generate the variation frequency.

6. The method for wave detection according to claim 5, wherein the step of checking whether the variation range detected from each of the difference images meets the stability condition comprises:

calculating an intersection between the variation range detected from a current difference image among the difference images and the variation ranges detected from K said difference images before the current difference image, wherein k is a positive integer;

determining whether the variation range detected from the current image is similar to the intersection according to positions and sizes of the variation range and the intersection; and determining that the variation range meets the stability condition if the variation range is similar to the intersection.

7. An electronic apparatus, comprising:

an image capturing device, successively capturing a plurality of images;

a storage device, storing a plurality of modules; and a processor, coupled to the image capturing device and the storage device, and loading and executing the modules in the storage device, wherein the modules comprises:

a variation degree determination module, calculating a difference image between each two adjacent images among the images, and determining a variation degree of the difference images according to pixel values of a plurality of pixels in the difference images;

a variation range detection module, detecting a variation range formed by the pixels having the pixels values to which a predetermined variation is occurred in each of the difference images when the variation degree determination module determines that the variation degree is over a predetermined degree; and a variation frequency determination module, determining whether a variation frequency of the pixel values within the variation range detected by the variation range detection module is over a predetermined frequency, and determining that a wave movement appears in the images when the variation frequency is over the predetermined frequency.

8. The electronic apparatus according to claim 7, wherein the variation degree determination module comprises checking whether the pixel value is greater than a first threshold for each of the pixels in the difference images, marking the checked pixel in an accumulated dynamic image when the pixel value of the checked pixel is greater than the first threshold, and determining whether the variation degree of the difference images is over the predetermined degree according to a number of times marked in the accumulated dynamic image for each of the pixels after successively checking N said difference images, wherein N is a positive integer greater than 1.

9. The electronic apparatus according to claim 8, wherein the variation degree determination module comprises determining whether at least one of the pixels having the number of times marked over a second threshold exists in the accumulated dynamic image, and determining that the variation degree of the difference images is over the predetermined degree when the at least one of the pixels having the number of times marked over the second threshold exists.

10. The electronic apparatus according to claim 8, wherein the variation range detection module comprises searching a plurality of dynamic pixels having the number of times marked over a third threshold among the pixels of the accumulated dynamic image, and locating a smallest rectangle having a range capable of including the dynamic pixels to serve as the variation range.

11. The electronic apparatus according to claim 7, wherein the modules further comprise:

a stability condition determination module, checking whether the variation range detected from each of the difference images calculated from most recent M said images meets a stability condition, wherein the variation frequency determination module counts a number of times that the stability condition is met as checked from the variation ranges, and divides the number of times by M to generate the variation frequency, wherein M is a positive integer greater than 1.

12. The electronic apparatus according to claim 11, wherein the stability condition determination module comprises calculating an intersection between the variation range detected from a current difference image among the difference images and the variation ranges detected from K said difference images before the current difference image, determining whether the variation range detected from the current image is similar to the intersection according to positions and sizes of the variation range and the intersection, and determining that the variation range meets the stability condition when the variation range is similar to the intersection, wherein k is a positive integer.

* * * * *